M. A. DU BOSE AND N. M. HARRISON.
VALVE LIFTING DEVICE.
APPLICATION FILED MAR. 1, 1921.
1,438,022.
Patented Dec. 5, 1922.
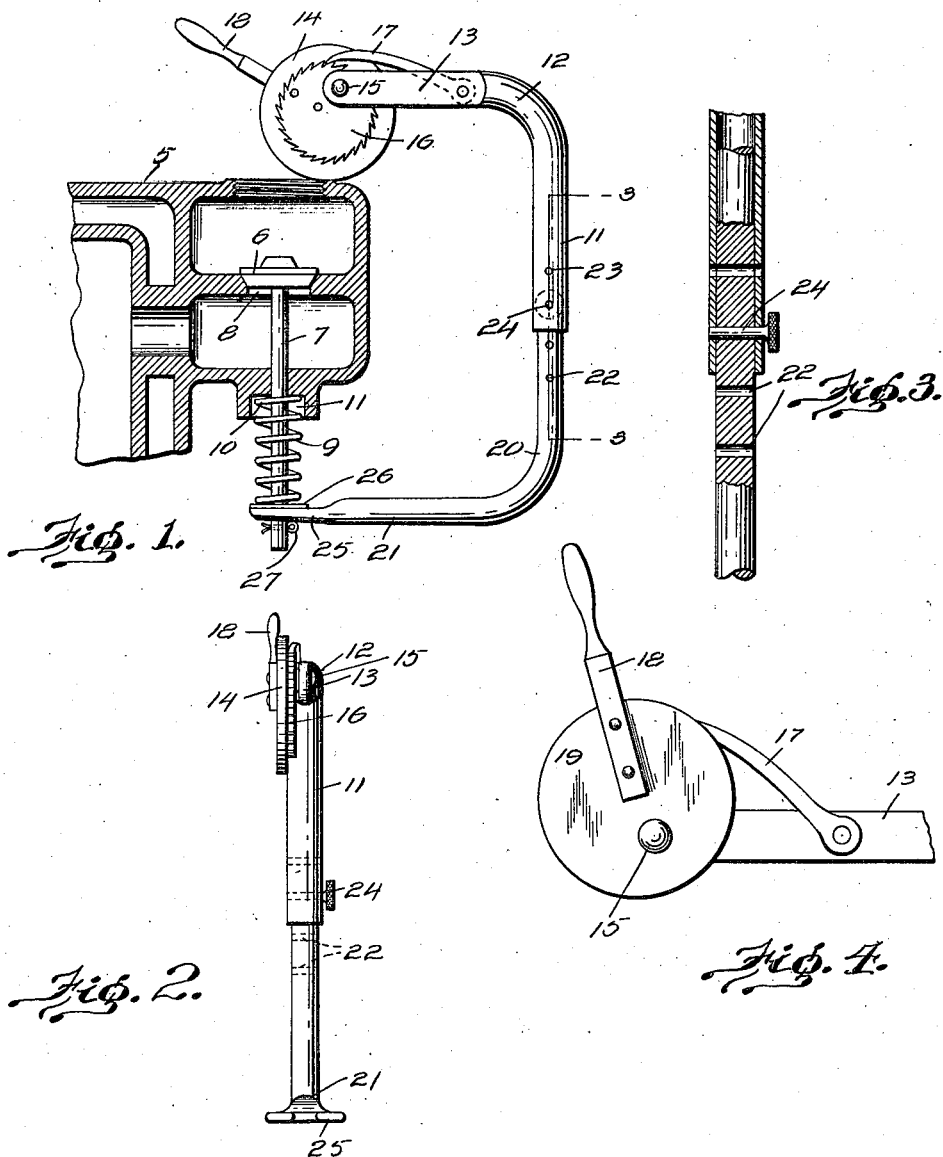
Inventor
M. A. DuBose,
N. M. Harrison.

Patented Dec. 5, 1922.

1,438,022

UNITED STATES PATENT OFFICE.

MARION A. DU BOSE AND NEBLETT M. HARRISON, OF MEMPHIS, TENNESSEE.

VALVE-LIFTING DEVICE.

Application filed March 1, 1921. Serial No. 448,748.

*To all whom it may concern:*

Be it known that we, MARION A. DU BOSE and NEBLETT M. HARRISON, citizens of the United States, residing at Memphis, in the county of Shelby and State of Tennessee, have invented certain new and useful Improvements in Valve-Lifting Devices, of which the following is a specification.

This invention relates to valve spring lifters or valve spring compressors and more particularly to that class of tools adapted to remove the valve springs from automobile engines and the like.

The primary object of the invention is the construction of a new and improved valve lifter capable of use in connection with practically any type of automobile engine for the removal of the valve by compressing the valve spring whereby the key or pin from the stem and the subsequent removal of the valve stem and spring may be effected so that the valve seat may be conveniently ground.

Another object of the invention is the provision of a tool or device of the type above set forth which can be vertically adjusted to sustain the valve spring in various degrees of compression without possible danger of bending the valve stem or dislodging it from the valve seat.

A further object of the invention will be found to reside in a valve lifting mechanism which is extremely simple in construction, consisting of comparatively few parts therefore inexpensive to manufacture, capable of universal use in connection with various types of automobile engines or the like, strong, durable, highly efficient and positive in operation for its intended purposes, extremely light in weight and otherwise constituting a convenient automobile tool auxiliary for automobile mechanics.

With these objects in view and others which will be manifest and suggested as the purpose and nature of our invention are revealed in the following specification and drawing, wherein we have shown but one preferred embodiment thereof, Figure 1 is a fragmentary vertical sectional view through a valve casing showing in side elevation the invention as applied in use.

Fig. 2 is a front view of the tool.

Fig. 3 is a sectional view taken on the line 3—3 of Fig. 1.

Fig. 4 is a detail view of the lifter wheel.

Referring now to the drawing where similar parts designate corresponding parts throughout the several views of the drawings, 5 is a valve casing of an automobile or other engine, 6 the valve, 7 the valve stem, 8 the valve seat, and 9 the valve spring, the upper end 10 of said spring being seated in a recess 11, all of which are of a well known construction and illustrated to show the operation of the valve spring lifter now to be described in detail.

The valve spring lifter proper comprises a tubular sleeve like member 11 having its upper end bent inwardly as at 12 and terminating in a horizontal, flat support or attaching arm 13. A lifter wheel 14, eccentrically pivoted at 15 to the outer end of the attaching arm 13 is provided with a ratchet 16 on its inner face, the teeth of said ratchet being engaged by a pivoted pawl 17 as clearly shown in Fig. 1. An operating handle 18 preferably secured to the outer face 19 of the lifter wheel affords a convenient means for actuating the said wheel and raise the sleeve like member. Slidably mounted within this member is an angular, lifter arm designated 20 bent inwardly as at 21 substantially parallel with the attaching arm 13 above referred to, the said lifter arm and tubular member together forming a substantially U-shaped tool for convenient manipulation to compress the valve spring for removal of the valve stem now to be referred to.

The upper portion of the lifter arm is provided with a plurality of transverse apertures for registration with similar apertures 23 in the lower end of the tubular member for the reception of a retaining stud 24 whereby the respective, adjustable elements may be retained in their predetermined position as is well understood.

The outer end 25 of the lifter arm is preferably bifurcated in order to straddle the lower terminal of the valve stem and receives the usual washer 26 so that as the lifter arm is raised, compressing the valve spring, the cotter pin 27, for instance, may be easily removed and upon subsequent release of the lifter arm out of engagement with the stem, the washer and valve spring may also be removed and the said stem raised out of its seat for the obvious purpose.

From this construction, it will be readily seen that the tubular member and the lifter arm slidable therein may be adjusted to various predetermined positions depending on the nature of the valve to be removed and since the lifter arm is raised in a perfectly vertical position, it will prevent the possible bending of the valve stem 7 or displacing the valve in its seat, which of course would be objectionable if the valve was to be again placed back in position. The adjustability of the valve lifter tool is such as permits its use in removing valves from practically all types of engines and since it is extremely simple and light in construction and made preferably in parts, the said tool may be easily and conveniently carried in a tool kit thus constituting a very important automobile mechanic's auxiliary.

In the accompanying drawings, we have illustrated our invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What we claim is:—

A tool of the class described comprising an angular sleeve like member, having a horizontal attaching arm, a vertically adjustable, angular lifter arm having a plurality of transverse apertures therein for registration with a plurality of apertures in the lower end of said sleeve, a retaining stud connecting said members, the opposite horizontal portion of said lifter arm terminating in a bifurcated end for engagement with a valve stem and valve spring, a lifter wheel and ratchet carried thereby eccentrically pivoted to the outer end of the horizontal attaching arm, a pivoted pawl cooperating with said ratchet and an operating handle for actuating said lifter wheel to raise the lifter arm and compress a valve spring.

In testimony whereof, we affix our signatures hereto.

MARION A. DU BOSE.
NEBLETT M. HARRISON.